Dec. 27, 1938.  H. C. MARSH  2,141,720
WRIST PIN LOCK
Filed Jan. 12, 1937
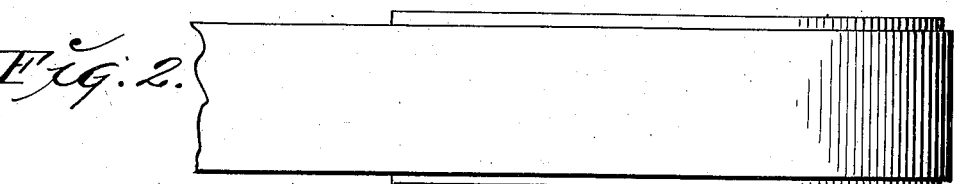
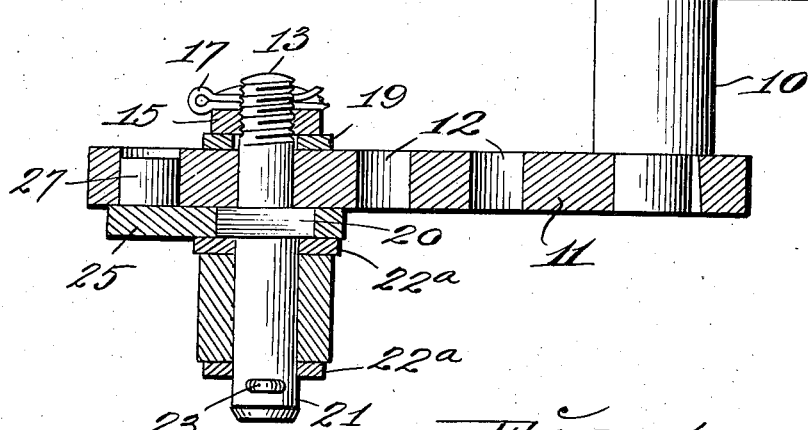
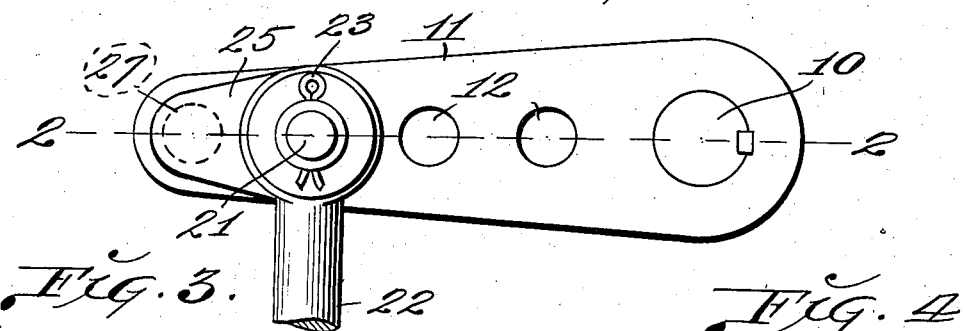
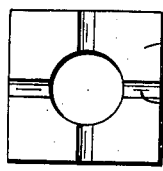
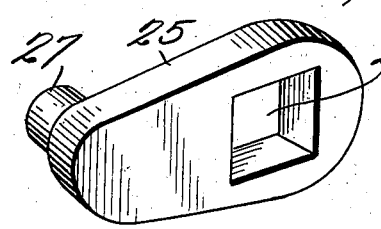
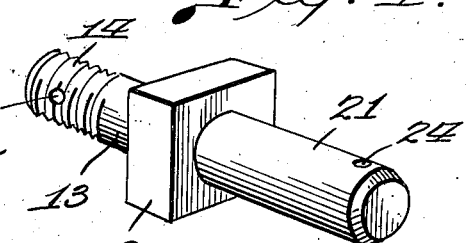
INVENTOR,
HARRY C. MARSH.
BY Martin C. Smith, ATTY.

Patented Dec. 27, 1938

2,141,720

UNITED STATES PATENT OFFICE 2,141,720

WRIST PIN LOCK

Harry C. Marsh, Long Beach, Calif., assignor of one-fourth to Elton Richardson, Long Beach, Calif.

Application January 12, 1937, Serial No. 120,191

5 Claims. (Cl. 74—600)

My invention relates to wrist pins and means for positively locking the same to crank arms, and the principal object of my invention is to provide relatively simple, practical and efficient means whereby a wrist pin may be adjustably positioned upon a crank and positively locked or secured against becoming loose while in service.

In various mechanisms, and particularly in well drilling and pumping rigs, motion is transmitted to a walking beam by means of a pitman, which latter is connected to and operated by a wrist pin that is carried by the crank arm of a rotating shaft.

It is one of the principal objects of my invention to generally improve upon and simplify the construction of the wrist pin and to combine therewith simple and efficient means for positively securing the wrist pin in its adjusted position upon the crank arm so as to overcome the possibility of the wrist pin from becoming loose and disengaged from the crank arm.

With the foregoing and other objects in view my invention consists in certain novel features of construction and arrangement of parts that will be hereinafter more fully described and claimed and illustrated in the accompanying drawing, in which:

Fig. 1 is an elevational view of a crank arm and showing a pitman connected thereto by means of my improved wrist pin.

Fig. 2 is a horizontal section taken on the line 2—2 of Fig. 1.

Fig. 3 is a plan view of a nut that is utilized in securing the wrist pin to the crank arm.

Fig. 4 is a perspective view of the wrist pin.

Fig. 5 is a perspective view of the member utilized between the wrist pin and crank arm for holding the wrist pin against rotary movement.

Referring by numerals to the accompanying drawing which illustrates a preferred embodiment of my invention, 10 designates a shaft which is driven in any suitable manner, for instance, by a belt and belting wheel, as illustrated in Fig. 2, and secured on said shaft is one end of a crank arm 11. Formed in said crank arm is a series of apertures 12, preferably spaced equidistant apart.

One end portion of a wrist pin 13 is adapted to pass through any one of the apertures 12, thus enabling said wrist pin to be adjusted to various distances away from the axis of shaft 10, and the end of that portion of the wrist pin that projects through any one of the apertures 12 is threaded, as designated by 14 for the reception of a nut 15.

The outer face of nut 15 is provided with cross grooves 16 for the reception of a cotter pin 17, and which latter passes through an aperture 18 that is formed in the threaded portion of the wrist pin. Thus after the nut has been tightened on the projecting threaded end of the wrist pin, the cotter pin is inserted through one of the cross grooves 16 and the aligned aperture 18 thus positively securing the nut on the wrist pin.

A washer 19 is interposed between the nut 15 and adjacent face of the crank 11. Formed integral with the central portion of the wrist pin is a square or non-circular block 20, which provides a shoulder that fits directly against the face of the crank 11 opposite the face against which the washer 19 is positioned and that portion 21 of the wrist pin that projects outwardly from block 20 receives the end of a pitman 22.

Arranged on both sides of the head of the pitman that is mounted on the wrist pin are washers 22a, one of which bears against the outer face of block 20 and these washers and the pitman are retained on the wrist pin in any suitable manner, preferably by a cotter pin 23 that passes through an aperture 24 in the end of the wrist pin.

The means utilized for securing the wrist pin against rotation in the crank arm, comprises a plate 25, having a square or rectangular opening 26 that receives the block 20, and projecting from one side of plate 25 opposite the end in which opening 26 is formed is a stud or pin 27 that is adapted to fit in any one of the apertures 12.

As a result of the construction just described, the wrist pin may be located in any one of the apertures 12 in the crank arm and the plate 25 mounted on the block 20 is positioned against the outer face of the crank arm with the stud or pin 27 seated in the aperture 12, adjacent the aperture in which the wrist pin is seated.

The engagement of the non-circular block 20 in the non-circular opening 26, effectively holds the wrist pin against rotation and the nut 15 and cotter pin 17 mounted on one end of the wrist pin effectively retain the wrist pin in proper position on the crank arm.

To achieve the desired results, the block 20 and the opening 26 that receives said block should be either square in shape, as illustrated in Figs. 4 and 5, or some other symmetrical angular shape; for instance an equi-lateral triangular, a true pentagon or hexagon.

Such construction enables the wrist pin 21 to be adjusted into a plurality of different positions corresponding to the movement of faces on the edge of block 20 and the corresponding faces in aperture 26, and thus compensate for any irregular wear of the pitman on that portion of the wrist pin with which it is engaged.

This particular advantage materially increases the life or period of service of the wrist pin.

Thus it will be seen that I have provided a wrist pin lock that is relatively simple in construction, inexpensive of manufacture, and very effective in performing the functions for which it is intended.

The device comprises few parts that are inexpensive of manufacture, and which parts are capable of being easily and quickly assembled or taken apart.

It will be understood that minor changes in the size, form and construction of the various parts of my improved wrist pin lock may be made and substituted for those herein shown and described without departing from the spirit of the invention, the scope of which is set forth in the appended claims.

I claim as my invention:

1. The combination with a crank arm provided with a row of spaced apertures, a wrist pin having one end adapted to be inserted through any one of the apertures in said crank arm, a symmetrical non-circular block formed integral with the intermediate portion of said wrist pin, a separately formed plate provided with a symmetrical non-circular opening for the reception of the block on said wrist pin said block and plate being substantially equal in thickness, and a stud projecting laterally from said plate for engagement in one of the apertures in said crank arm.

2. The combination with a crank arm provided with a row of spaced apertures, a wrist pin having one end adapted to be inserted through any one of the apertures in said crank arm, a symmetrical non-circular block formed integral with the intermediate portion of said wrist pin, a separately formed plate provided with a symmetrical non-circular opening for the reception of the block on said wrist pin said block and plate being substantially equal in thickness, a stud projecting laterally from said plate for engagement in one of the apertures in said crank arm, and means mounted on the end of the wrist pin that projects through said crank arm for securing said wrist pin to said crank arm.

3. In a wrist pin lock, the combination with a wrist pin provided intermediate its ends with a symmetrical non-circular portion, a plate having a symmetrical non-circular opening for the reception of the non-circular portion of said wrist pin, and a stud projecting laterally from one side of said plate adjacent the end thereof.

4. The combination with a crank arm provided with a pair of apertures, a wrist pin having one end seated in one of said apertures, a symmetrical non-circular block formed on said wrist pin and bearing against the crank arm in which the wrist pin is seated, a plate provided with a symmetrical non-circular opening for the reception of the symmetrical non-circular block on said wrist pin, and a stud projecting laterally from said plate and positioned in the other one of the apertures in said crank arm.

5. The combination with a crank arm provided with a pair of apertures, a wrist pin having one end seated in one of said apertures, a symmetrical non-circular block formed on said wrist pin and bearing against the crank arm in which the wrist pin is seated, a plate provided with a symmetrical non-circular opening for the reception of the symmetrical non-circular block on said wrist pin, a stud projecting laterally from said plate and positioned in the other one of the apertures in said crank arm, and means positioned on the end of the piston that projects through the crank arm for securing said wrist pin to said crank arm.

HARRY C. MARSH.